H. L. GRAY.
SEED SEPARATOR.
APPLICATION FILED JULY 23, 1917.

1,277,062.

Patented Aug. 27, 1918.
4 SHEETS—SHEET 1.

Inventor
Harold L. Gray

Witness
Ed. R. Lusby
Lester L. Sargent

By Jerry A. Mathews,
Attorney

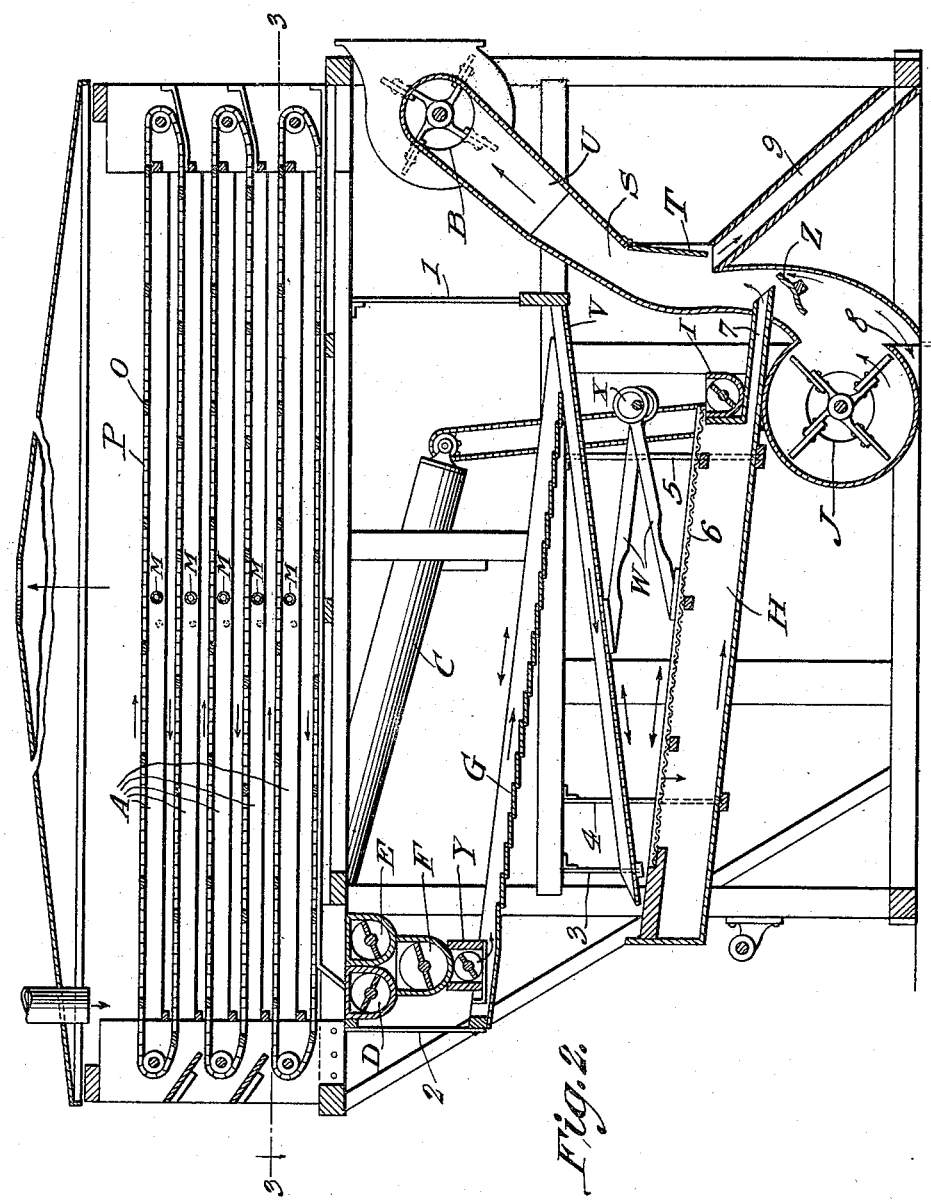

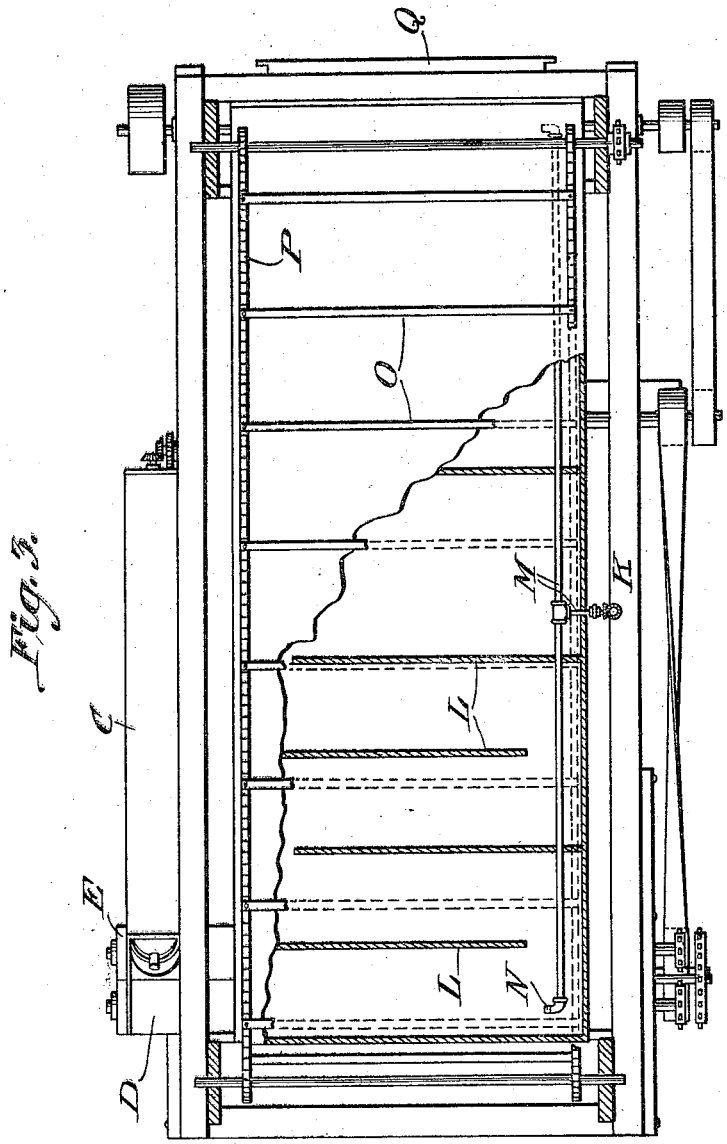

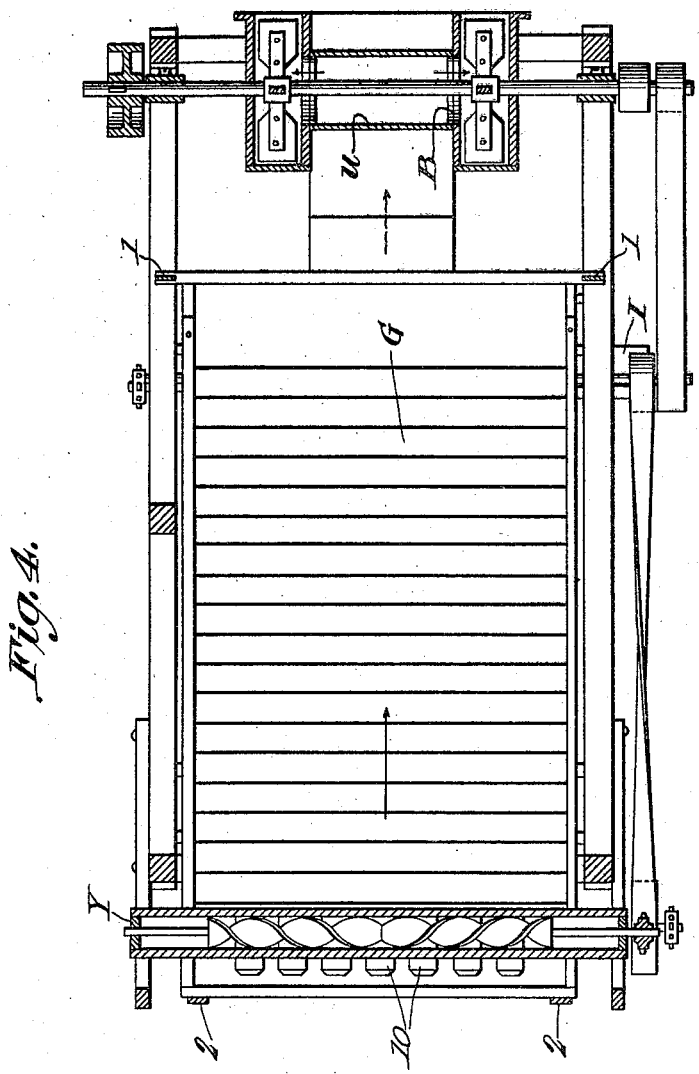

UNITED STATES PATENT OFFICE.

HAROLD LINE GRAY, OF CRAWFORDSVILLE, INDIANA, ASSIGNOR TO CRABBS REYNOLDS TAYLOR COMPANY, OF CRAWFORDSVILLE, INDIANA, A CORPORATION OF INDIANA.

SEED-SEPARATOR.

1,277,062.   Specification of Letters Patent.   Patented Aug. 27, 1918.

Original application filed May 17, 1917, Serial No. 169,540. Divided and this application filed July 23, 1917. Serial No. 182,326.

*To all whom it may concern:*

Be it known that I, HAROLD L. GRAY, a citizen of the United States, residing at Crawfordsville, in the county of Montgomery and State of Indiana, have invented new and useful Improvements in Seed-Separators, of which the following is a specification.

This application is a division of my pending application, Serial No. 169,540.

The object of my invention is to provide improvements in a seed separator for separating useful grain seeds, such as clover seed, from the seeds of noxious weeds such as buckhorn seed, which differ from clover seed in having a surface coating which becomes mucilaginous when moistened, and to which sawdust will adhere. It is an especial object of my invention to provide novel and improved means for moistening the sawdust, mixing it with the seed so that it will form a coating for the mucilaginous seed thereby producing a ball of larger size than the clover seed. With my new apparatus, the wet seed is thoroughly mixed first and given ample time for the water to set in the mucilaginous seed. It is then quickly dropped into hot sawdust and rapidly spread over an upper shaker shoe where it rolls over and over, the mucilaginous seed gathering into balls large enough to easily pass over screens with larger perforations, than has been possible with former methods.

It is further my object to provide a novel fanning arrangement utilizing an exhaust fan and a blower and a large sawdust collector. With the novel fanning construction which I have devised the separation of the sawdust from the seed is performed more effectively and the necessity for a second cleaning of the seed in a separate machine, which has heretofore been necessary, is now eliminated.

It is further my object to provide a novel construction and arrangement of shaker shoes and conveyers, which run more smoothly than the seed separating table heretofore used and make less noise and require less horse power.

It is further my object to provide a machine of novel construction so arranged as to greatly increase its capacity and permit of successful operation with less interference from unfavorable weather conditions.

It is an object of my invention to provide novel and improved means for drying the sawdust which is to be mixed with the seed.

It is further my object to provide a machine having a comparatively small number of parts, whereby to lessen the expense of construction and repairs.

With these and other objects in view, I provide the mechanism illustrated in the accompanying drawings, in which—

Fig. 2 is a vertical section of the entire machine;

Fig. 3 is a horizontal section on line 3—3 of Fig. 2, a portion being broken away to show the arrangement of members L; and Fig. 4 is a horizontal section on line 4—4 of Fig. 1.

Like characters of reference designate like parts throughout the several views.

Figure 1:
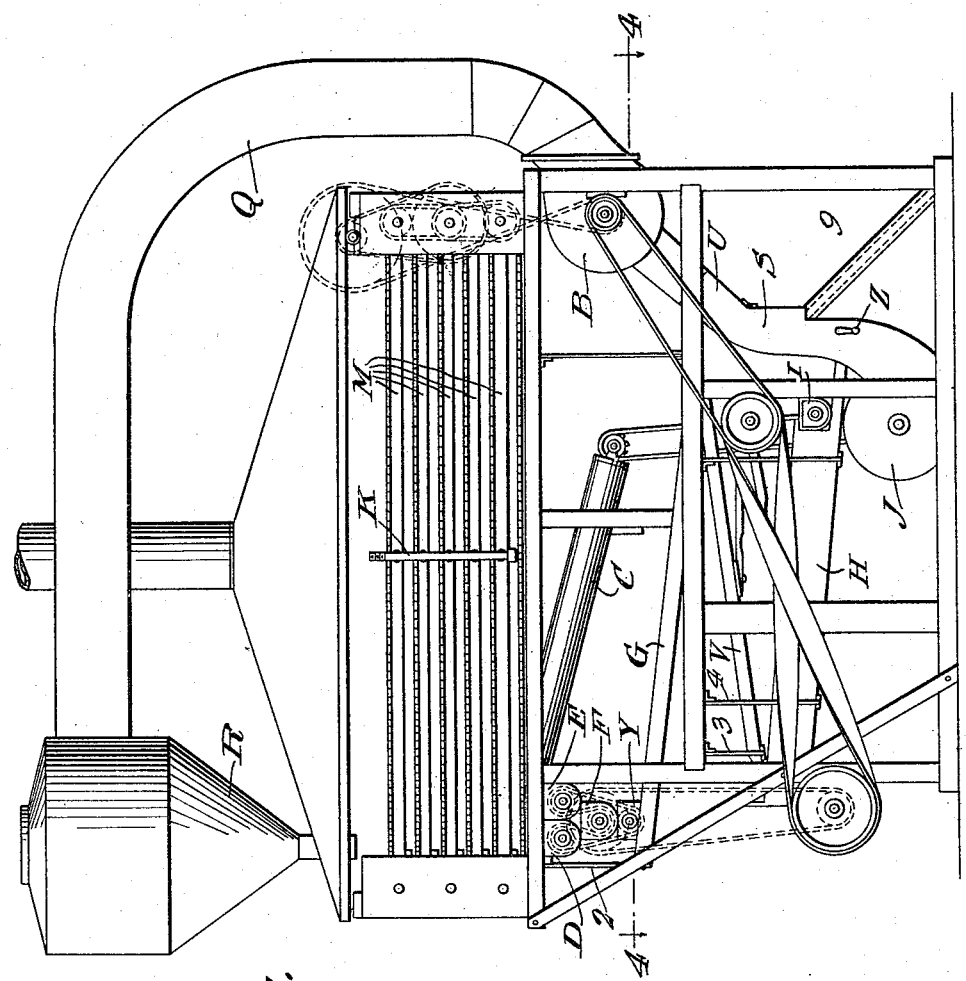
Figure 1 is a side elevation of the entire machine.

Referring to the accompanying drawings, I provide a pipe Q, through which the sawdust is blown to the dust collector R, from whence it is delivered to the pans A. There are a plurality of these pans arranged in superposed relation. I provide endless chains P which carry spaced cross bars O so disposed as to sweep over the pans as the endless chains are operated. I provide a steam pipe K through which steam is delivered to pipes M and thence through suitable nozzles N, whereby live steam is distributed over the pans A, diverting walls L being provided as shown in Fig. 3.

Members C, D, E, F, Y, and G, take the place of the separating table heretofore employed in seed separating machines of this type. The seed is fed into the lower end of conveyer C and mixed with water at this point. Conveyer C is mounted at an incline or angle of about thirty degrees. It empties into conveyer E, which also is a spiral conveyer. The sawdust from the lowest of the pans is delivered to conveyer D, also a spiral conveyer by which it is carried to one end and delivered to conveyer F, the seed in conveyer E similarly being delivered to conveyer F. Seed and sawdust are mingled in conveyer F and from it are delivered to conveyer Y. Conveyer Y differs from conveyers C, D, E and F in being a two-way conveyer, as illustrated in Fig. 4. The sawdust and seed which by this time are well mixed are dropped onto a novel shaker pan G of stepped construction, as shown in Fig. 2. From pan G the seed and sawdust are gradually shaken down to inclined platform V. In passing over shaker G, the mucilaginous seed gathers the sawdust about it so as to form small balls of considerably larger size than the clover seed. From member V the seed is delivered to a suitable grain shoe H. The seed which has collected the sawdust about it and is too large to pass through the screening 6 flows into a spiral conveyer 1, which carries it out of the machine. The smaller seed which is non-mucilaginous falls readily through the screen to the bottom of grain shoe H and flows through spout 7 into the pipe or conduit U. Members G and V are both supported by a flexible bar 1 at one end, while member G is supported by a flexible bar 2 at the other end and member V by a flexible bar 3, at the corresponding end which is the front of the machine. These members are suspended by flexible bars to permit of their being given a vibratory or shaking movement. Similarly, grain chute H is suspended from the frame of the machine by flexible bars 4 and 5. A vibratory movement to members G, V and H is communicated by eccentric rods W, preferably shaped as shown in Fig. 2, which are operated by eccentrics X, as illustrated in Fig. 2.

Referring to Fig. 2, there is illustrated novel means for separating the sawdust and seed and for returning the sawdust to the dust collector R and thence to the pans A where it is used over again. I provide a pipe U, at the lower end of which is a blower fan J driven at such speed as to force a current of air that will carry the sawdust and seed up the pipe to approximately the portion designated S. At this point the driving force of the blower is superseded by the suction from an exhaust fan B disposed in the upper portion of pipe U, as illustrated in the drawings. A suitable valve T is provided in pipe U immediately below the narrow portion S of pipe U, and just above a discharge chute 9 opening out of pipe U. I also provide a suitable valve or vane Z, consisting of a metal plate of the shape shown in the drawings and extending the full length across the conduit and working on a pivot in order that it may be adjusted to stay the flow of seed to better advantage and aid the lower fan J in making the separation. The position of member Z is changed but little and while it may regulate the current of air to a certain extent I do not consider it as an air regulator as its primary function is to break up the force of the seed and aid the separation at this point. In my machine the small seeds and sawdust both come over in great volume and the seed from the shaker is dropped across the blast and partly stopped in its way by the metal valve Z, which causes a distinct separation. The operation is aided by the bouncing of the seed upon member Z, the fan J breaking up the flow of seed and aiding in the separation. The separation of the light from the heavier particles takes place entirely in my conduit S, the heavy material dropping below and the light being carried up into the exhaust fan B, and swept along to the dust collector R. I may provide a discharge chute 9 into which seed may fall. Valves Z and T may be adjusted by any suitable means such as by projecting knobs or handles.

The operation of the machine has been described in connection with the foregoing explanation of its construction. By providing the series of superposed pans, the capacity of the machine has been greatly increased. The fact of using screens with larger perforations and the employment of my improved method of mingling the seed and sawdust has also made it possible to operate on a much larger quantity of seed than heretofore. The shaker shoes and conveyers which have taken the place of the table employed in former seed separating machines provide an important improvement in that they run twice as smoothly, with very little noise and require less horse power. The employment of the novel arrangement of a combined blower and exhaust fan makes it possible to effect a more complete and thorough separation of seed from sawdust. With the new method, the wet seed is thoroughly mixed first and given ample time for the water to set in the mucilaginous seed. It is then quickly dropped into hot sawdust and rapidly spread over the upper shaker platform where it rolls over and over from step to step downwardly. This enables the mucilaginous seed to collect about it a coating of sawdust so as to form balls large enough to easily pass over the screen which has larger perforations than has been possible with former machines, thus causing a more effective separation of the useful non-mucilaginous clover seed from the mucilaginous and undesirable buckhorn and other weed seeds.

What I claim is:

1. In a seed separating machine, the combination of a lower blower fan, an upper exhaust fan, an inclined conduit extending between and connecting the fans, a valve positioned to receive and break up the flow of seeds entering the conduit, a discharge spout positioned to receive the heavy material, a second discharge spout for seeds of medium grade, the lightest material being sucked upward by the current created by the exhaust fan, substantially as described.

2. In a machine for separating heavy seeds into one grade and lighter seeds into a single distinct grade, the combination of a blower fan, an exhaust fan positioned above the blower fan, an inclined conduit directly connecting the two fans, the aforesaid conduit being of substantially the same cross sectional area, a feeding chute opening into the conduit above the blower fan and supplying the seed in a layer so that an even amount and large volume of material is presented to the blast, an adjustable valve positioned below the feeding chute and above the blower fan to receive the outflow of seeds from the chute and to aid in separating the seed, and means for the discharge of seeds of different weights into separate receptacles, substantially as set forth.

3. In a seed separating machine, the combination of a blower fan, an exhaust fan in elevated position, a conduit directly connecting the two fans, the said conduit being of substantially the same cross sectional area throughout, a discharge conduit opening out of the aforesaid conduit, a seed feeding chute opening into the first mentioned conduit at a point above the blower fan the seed being supplied to the blast in an even layer, a seed separating valve positioned beneath the feeding chute and above the blower fan to receive the outflow of seeds from the chute, a conduit for the discharge of the lightest weight material into drying pans, substantially as set forth.

4. In fan mechanism for separating seeds into two distinct grades, the combination of a blower fan, an elevated exhaust fan, a conduit directly connecting the two fans, a seed feeding chute opening into the aforesaid conduit, a valve positioned below the said chute and above the blower fan to receive the outflow of seeds from the chute and for separating the heavy and light material, a discharge conduit positioned above the aforesaid valve for the discharge of medium weight seeds from the main conduit, a second discharge conduit positioned below the valve for the discharge of heavy material, the lightest material being sucked up by the exhaust fan, and means for conveying said light material from the exhaust fan, substantially as shown.

5. In a seed separating machine, the combination of an upper exhaust fan, a lower blower fan, an inclined conduit directly connecting the two fans, a seed chute opening into the aforesaid conduit above the blower fan, a valve positioned below said chute to receive the outflow of seeds from the chute and for separating seeds entering the chute, discharge chute openings out of the conduit for the discharge of seeds in two distinct grades, arranged as described.

6. In a seed separating machine, the combination of an exhaust fan in elevated position, a lower blower fan, an inclined conduit leading from one fan to the other, a discharge conduit for the heaviest material, a seed chute opening into the conduit, a second discharge conduit for the discharge of medium weight material, said conduit being connected with the main conduit above the seed supply chute, an adjustable valve positioned below the seed chute, to receive the outflow of seeds from the chute and means for adjusting said valve, substantially as set forth.

7. In a seed separating machine, the combination of an exhaust fan, an inclined conduit directly connecting the exhaust fan with a blower fan, a blower fan, a seed supply chute opening into the conduit a short distance above the blower fan, a valve positioned below said chute to receive the outflow of seeds from the chute and for separating the seed, a plurality of discharge spouts opening out of the conduit for the collection of seeds of different grades and weights, the separation of the seeds being effected by the aforesaid valve and by the current of air holding the seed in temporary suspension at a point to permit the lighter material being sucked up by the exhaust fan and the heavier medium grade seeds being discharged through the adjacent discharge spout, arranged as described and for the purposes specified.

8. In a seed separating machine, the combination of an upper exhaust fan, a lower blower fan, a conduit directly connecting the two fans, a seed supply chute opening into said conduit, a discharge spout opening out of the conduit above said seed supply chute, a valve for effecting separation of the seed, positioned below the seed supply chute and above the blower fan to receive the outflow of seeds from the chute, means for regulating the opening into the aforesaid discharge spout, the conduit connecting the two fans being of substantially the same cross sectional area throughout, for the purposes described.

9. In a seed separating machine, the combination of an upper exhaust fan, a lower blower fan, a conduit directly connecting the two fans, said conduit being of substantially the same cross sectional area throughout, a seed supply chute opening into said conduit, means for the discharge of separated seeds from the conduit, a valve positioned below the seed supply chute to receive the outflow of seeds from the chute, said valve being transversely curved in cross section, and means for adjusting the valve, to aid in the separation of seed, substantially as and for the purposes described.

HAROLD LINE GRAY.

Copies of this patent may be obtained for five cents each, by addressing the "Commissioner of Patents, Washington, D. C."